United States Patent
Khalid et al.

(10) Patent No.: US 7,895,425 B2
(45) Date of Patent: Feb. 22, 2011

(54) OPERATION, ADMINISTRATION AND MAINTENANCE (OAM) IN A SERVICE INSERTION ARCHITECTURE (SIA)

(75) Inventors: Mohamed Khalid, Cary, NC (US); Paul Quinn, San Francisco, CA (US); Kenneth Durazzo, San Ramon, CA (US); Robert Gleichauf, San Antonio, TX (US); Richard M. Pruss, Tewantin (AU)

(73) Assignee: Cisco Technology, Inc., San Jose, CA (US)

( * ) Notice: Subject to any disclaimer, the term of this patent is extended or adjusted under 35 U.S.C. 154(b) by 803 days.

(21) Appl. No.: 11/833,479

(22) Filed: Aug. 3, 2007

(65) Prior Publication Data

US 2009/0037713 A1 Feb. 5, 2009

(51) Int. Cl.
*G06F 9/00* (2006.01)
(52) U.S. Cl. .......................................... 713/1; 709/226
(58) Field of Classification Search ...................... 713/1; 709/226
See application file for complete search history.

(56) References Cited

U.S. PATENT DOCUMENTS

| | | | |
|---|---|---|---|
| 5,878,129 A * | 3/1999 | Figurski et al. ............. 379/230 |
| 7,355,978 B2 * | 4/2008 | Fontana et al. ........... 370/236.2 |
| 7,486,622 B2 * | 2/2009 | Regan et al. ................. 370/236 |
| 7,561,524 B2 * | 7/2009 | Chun et al. ............. 370/236.2 |
| 7,599,310 B2 * | 10/2009 | Nam et al. ................... 370/252 |
| 7,643,424 B2 * | 1/2010 | Liu et al. ................. 370/236.2 |
| 2002/0032798 A1 * | 3/2002 | Xu ............................. 709/238 |
| 2004/0184407 A1 | 9/2004 | Pok et al. | |
| 2006/0092847 A1 | 5/2006 | Mohan | |
| 2006/0112400 A1 * | 5/2006 | Zhang et al. ................. 719/328 |
| 2007/0133502 A1 | 6/2007 | Osswald | |

OTHER PUBLICATIONS

U.S. Appl. No. 11/400,695, filed Apr. 7, 2006, Paul Quinn, et al.
U.S. Appl. No. 11/655,363, filed Jan. 19, 2007, Paul Quinn, et al.
U.S. Appl. No. 11/766,309, filed Jun. 21, 2007, Mohamed Khalid, et al.

* cited by examiner

*Primary Examiner*—Chun Cao
(74) *Attorney, Agent, or Firm*—Fish & Richardson P.C.

(57) ABSTRACT

In one embodiment, a method can include: selecting an operation, administration, and maintenance (OAM) type for a destination, where the destination is enabled for a service insertion architecture (SIA); encapsulating an OAM packet with the OAM type indicated in a service header therein; and sending the OAM packet to the destination.

20 Claims, 9 Drawing Sheets

OPERATION, ADMINISTRATION AND MAINTENANCE (OAM) IN A SERVICE INSERTION ARCHITECTURE (SIA)

TECHNICAL FIELD

The present disclosure relates generally to operation, administration, and maintenance (OAM) for service insertion architecture (SIA) chains of services.

BACKGROUND

A service insertion architecture (SIA) can provide a brokered service framework for inserting services into a data network. Also, operation, administration, and maintenance (OAM) may describe processes, activities, tools, and standards, involved with operating, administering, and/or maintaining computer networks or systems.

DESCRIPTION OF EXAMPLE EMBODIMENTS

Overview

In one embodiment, a method can include: selecting an operation, administration, and maintenance (OAM) type for a destination, where the destination is enabled for a service insertion architecture (SIA); encapsulating an OAM packet with the OAM type indicated in a service header therein; and sending the OAM packet to the destination.

In one embodiment, an apparatus can include: one or more processors; and logic encoded in one or more tangible media for execution by the one or more processors, and when executed operable to: select an OAM type for a destination, where the destination is enabled for SIA; encapsulate an OAM packet with the OAM type indicated in a service header therein; and send the OAM packet to the destination.

In one embodiment, a method can include: receiving an OAM packet in a device enabled for SIA; parsing an OAM type from a service header in the OAM packet; and sending a reply packet to a source node or a next node, where the reply packet includes reply information based on the OAM type.

In one embodiment, an apparatus can include: one or more processors; and logic encoded in one or more tangible media for execution by the one or more processors, and when executed operable to: receive an OAM packet in a device enabled for SIA; parse an OAM type from a service header in the OAM packet; and send a reply packet to a source node or a next node, where the reply packet includes reply information based on the OAM type.

Example Embodiments

In particular embodiments, operation, administration, and maintenance (OAM) tools/applications can be provided for use within the service insertion architecture (SIA) framework. Such OAM mechanisms may be used with service insertion aware or SIA-enabled devices to: (i) verify service path; (ii) verify service status; (iii) report service path; (iv) report service status; (v) generate appropriate event information; and (vi) carry additional information used for validation, troubleshooting, and/or reporting of the service, such as user-specified variables (e.g., service name or geographic location). Further, verification may be addressed by SIA aware diagnostic packets configured to mimic normal packets to be serviced. In this fashion, SIA OAM can be utilized for proactive connectivity monitoring, fault detection, fault isolation, fast defect notification, and/or corrective triggering action when a fault is detected.

Figure 1:
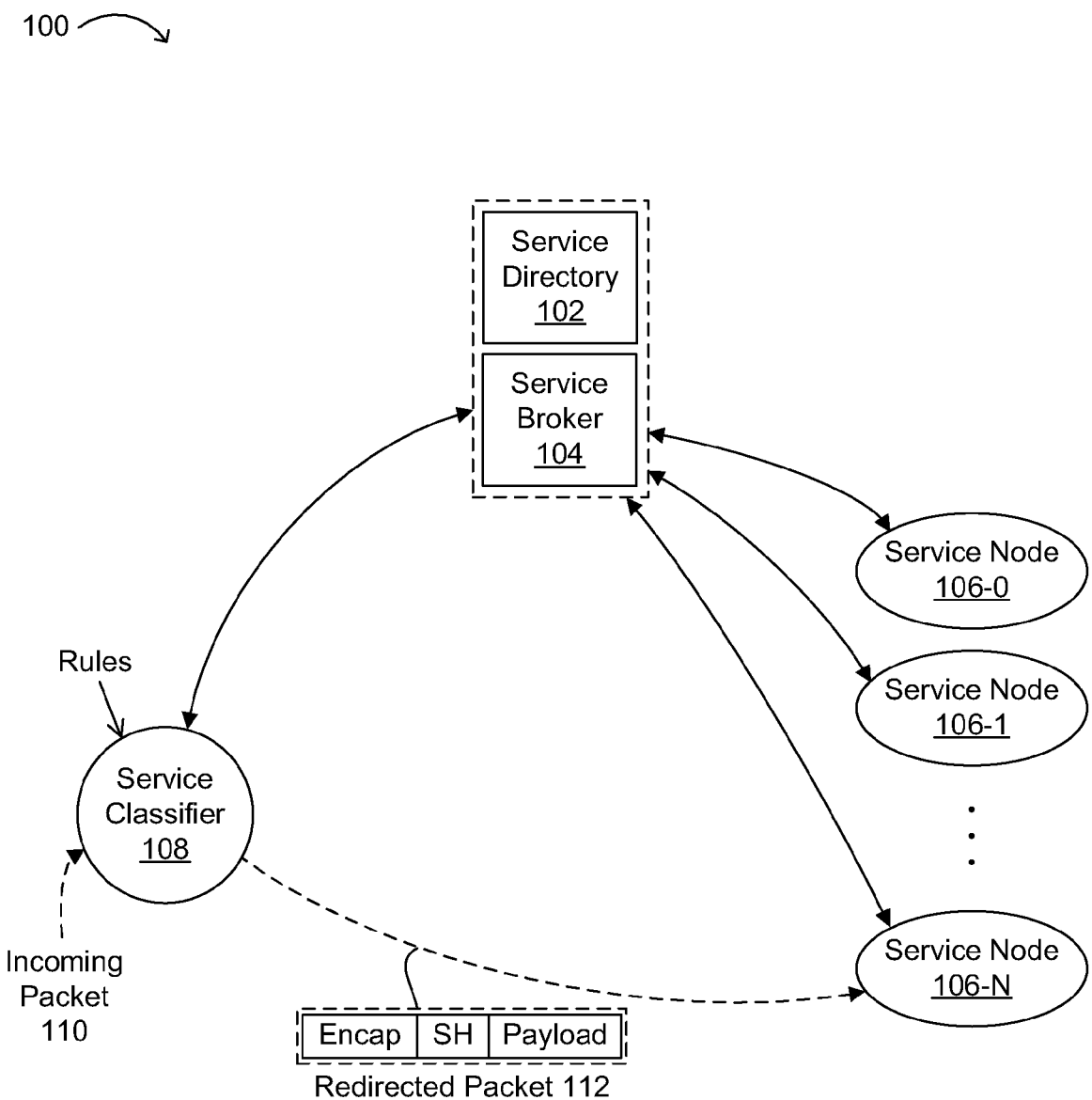
FIG. 1 illustrates an example service insertion architecture (SIA).

Referring now to FIG. 1, an example SIA is indicated by the general reference character 100. Service directory 102 can be a relatively static store for infrequently changing information, such as policy definition and/or service mapping. For example, a policy definition can include a service name (e.g., "red" or "userservices"), and service feature type (e.g., intrusion prevention system (IPS), firewall), and this can be communicated to service broker 104. Service directory 102 can also act as a policy point for distribution (as opposed to definition) for a previously established policy. Service directory 102 can also act as a policy communication point (e.g., working in conjunction with other policy stores).

In a service insertion architecture, service broker 104, or other service directories, may be the only nodes that communicate directly with service directory 102. Further, a service directory can: (i) accept, via a policy plane, service chaining or predetermined ordering, and chain to service node (e.g., service nodes 106-0, 106-1, . . . 106-N) mapping configuration; (ii) act as store/interface for service insertion architecture policy information; (iii) be replicated for scaling; and/or (iv) communicate, via programmatic interfaces, with other policy points.

Service broker 104 can handle communication and control plane traffic from/to service nodes 106-0, 106-1, . . . 106-N, and service classifier 108. The service nodes can contact service broker 104 to register services and receive, from service broker 104, information about domain-wide services and service context (e.g., header) to service mapping. When service classifier 108 requests services, service broker 104 can return an appropriate "best match" service context, as well as service location (e.g., next hop) or "reachability" information. In addition, such communication and control plane allocation can be performed via a control plane. Further, a first service node (e.g., service node 106-N) can also operate as a service broker for other participating service nodes, and/or may offer secondary or tertiary classification.

Service brokers can perform the following: (i) authenticate and authorize service classifiers and service nodes; (ii) exchange service registration information with service nodes, including withdrawal of a service; (iii) communicate service context to service node mapping information to service nodes; (iv) return service information in response to a request from a service classifier (e.g., get a namespace-based request and return header and other pertinent information); (v) present consistent view of a state of service topology for management purposes; and/or (vi) be included in a hierarchy of service brokers. Service broker 104 may also be "anycasted" for redundancy and load distribution.

A service node (e.g., service nodes 106-0, 106-1, . . . 106-N) can include a router, appliance, a switch filled with blades, a blade, a software process, or any distinguishable entity that can deliver or execute any appropriate service or feature. A service node can perform one or more service fragments and may participate in both the control plane and the data plane. Post authentication and authorization, a service node can register its capabilities with a service broker. Additionally, service nodes can receive from service broker 104, when required, service context, data plane information (e.g., one or more encapsulation types) and/or a next-hop location or reachability indication for the next service feature in the chain. In certain circumstances, a service node can also modify service headers (e.g., when instructed to do so by service broker 104 in a change of chain scenario), and/or bits in a service header can be added/modified for use in OAM scenarios, as will be discussed in more detail below.

One or more of service nodes 106-0, 106-1, . . . 106-N, can: (i) perform service features (e.g., firewall); (ii) register and send capabilities with service broker 104; (iii) send service information to service broker 104; (iv) receive service context to next-hop mapping if required; (v) receive data forwarding specifics (e.g., encapsulation type) from service broker 104; and/or (vi) participate in the data plane with service classifier 108.

Service classifier 108 can be a first entry point for a packet (e.g., incoming packet 110) in particular service insertion architecture embodiments, and thus may be an "edge" of a service domain. Service classifier 108 can also participate in the control plane with service broker 104, and in the data plane with service nodes 106-0, 106-1, . . . 106-N. In particular embodiments, service classifier 108 can operate as an edge, and can perform: (i) authentication and authorization to/from service broker 104; (ii) initial policy choice based on classification and associated namespace; (iii) communication with service broker 104 to send namespace and receive appropriate service or context information (e.g., service header); (iv) service header insertion onto data plane packets; (v) data plane packet encapsulation for network delivery; and/or (vi) forward data packets for servicing.

Service classifier 108 can classify data and, based on a match criteria therein, determine which service path applies, append a service header to incoming packet 110, and then forward the packet to a first service node in the service chain. Such a service in a service node can be made up of many service features (e.g., a firewall, and an IDS, forming two service "features"). Service classifier 108 may be a self-contained router, or multiple such routers or other devices.

In FIG. 1, an example operational flow can include a service node registering, or exchange of capabilities over the control plane. To register the service nodes, each of service nodes 106-0, 106-1, . . . 106-N, can indicate to service broker 104 that the service node represents a service feature or features having certain capabilities. For example, service node 106-1 may indicate that it is a firewall, supports certain types of exchanges, and is deployed in a designated location. Service classifier 108 can also register by providing capabilities, and requesting services via the use of a namespace (e.g., "cable companies who pay me $5"), and service broker 104 can return service information.

As shown, service classifier 108 can be provisioned with rules, and as a result of such rules, service classifier 108 can make a service request (e.g., all traffic from User A that goes to User B matches rule X, and request appropriate services). Thus, service classifier 108 may make requests as a result of the classification rule whereby services can be requested based on the classification.

Service broker 104 can return service information to service classifier 108, including a service context (e.g., using existing bits within the header, or creating a new header or using memory space), reachability (or next-hop information in an IP application), and encapsulation. Once such service information has arrived in service classifier 108, actual data packets (e.g., incoming packet 110) may be received. The packets can then be redirected (e.g., redirected packet 112) with an encapsulation, a service header (SH), and payload, and the redirected packet can then be sent to a first service node in a service chain or predetermined ordered list of services/nodes. In the particular example shown in FIG. 1, service node 106-N may be first in such a chain for redirected packet 112, followed by another of the service nodes, and so on until all designated service nodes have been traversed.

As discussed above, in particular embodiments, a service insertion architecture can add context to packets, insert context specific packets into a flow, or create a pointer to some type of context "heap" (e.g., a data resident in a service broker, or a separate data store). One form of context can include a service header to convey information about a redirected packet (e.g., 112). For example, service chain information for a packet may be carried in the service header, where this information can allow services to know a required service path for a given packet. Further, service chain information need not be static, but rather services can modify such chain information to alter the path taken by a packet. Alternatively, context may be non-header packet context, such as may include context stored in memory that is pointed to for processing, for example.

In particular embodiments, an SIA service header can provide information about flow classification, as populated by a service classifier (e.g., 108) and/or prior service nodes (e.g., 106-0, 106-1, . . . 106-N). Such classification information can be used to avoid duplicate classification or to provide classification information to a node that could not perform requisite classification. Examples include subscriber/user identifiers, ingress interface information, quality of service information, etc. As with service chaining information, service nodes can update packet information in particular embodiments. In addition, a service header can incorporate status information to report a path of a packet through services, and/or to provide other administrative or diagnostic information.

As discussed above, redirection can send a packet from an ingress service classifier (e.g., 108) to a first service node (e.g., 106-N) via the data plane, regardless of the physical location of any service node. Both the original packet (e.g., incoming packet 110) and an associated service context may be redirected to a particular service node for service processing. This service node can then perform a service and, if needed, may redirect the packets to a next service node in the predetermined order or path of the service chain. Such a predetermined order or path may be indicated in the service context, for example.

In particular embodiments, an SIA and/or system may enforce no proximity requirement such that a packet can be redirected to intra-device resources (e.g., an in-chassis blade), to directly connected external devices, or across a network. Thus, the service path can be composed of any combination of service locations. Regardless of a redirection destination, an original IP packet, or data within an Ethernet frame, and associated service header may be encapsulated in a new appropriate data plane header for delivery. Once an outer transport header is applied, such packets can be forwarded using existing data plane models.

Due to such service models enabled by SIA and discussed above, OAM may be critical for successful adoption and deployment. As SIA embraces new service-specific topologies, OAM extensions in particular embodiments can accommodate areas to which conventional OAM approaches may not support. In particular embodiments, an SIA application or process embedded in the service may be responsible for response/forwarding mechanisms, as opposed to conventional OAM methods that rely on network-only mechanisms. In this fashion, one can verify not only network path connectivity and service level information, but also that the service itself is correctly configured to respond to the service path. Further, SIA verification may be performed once a service chain is established to check that policies and/or the service chain are intact.

Figure 2:
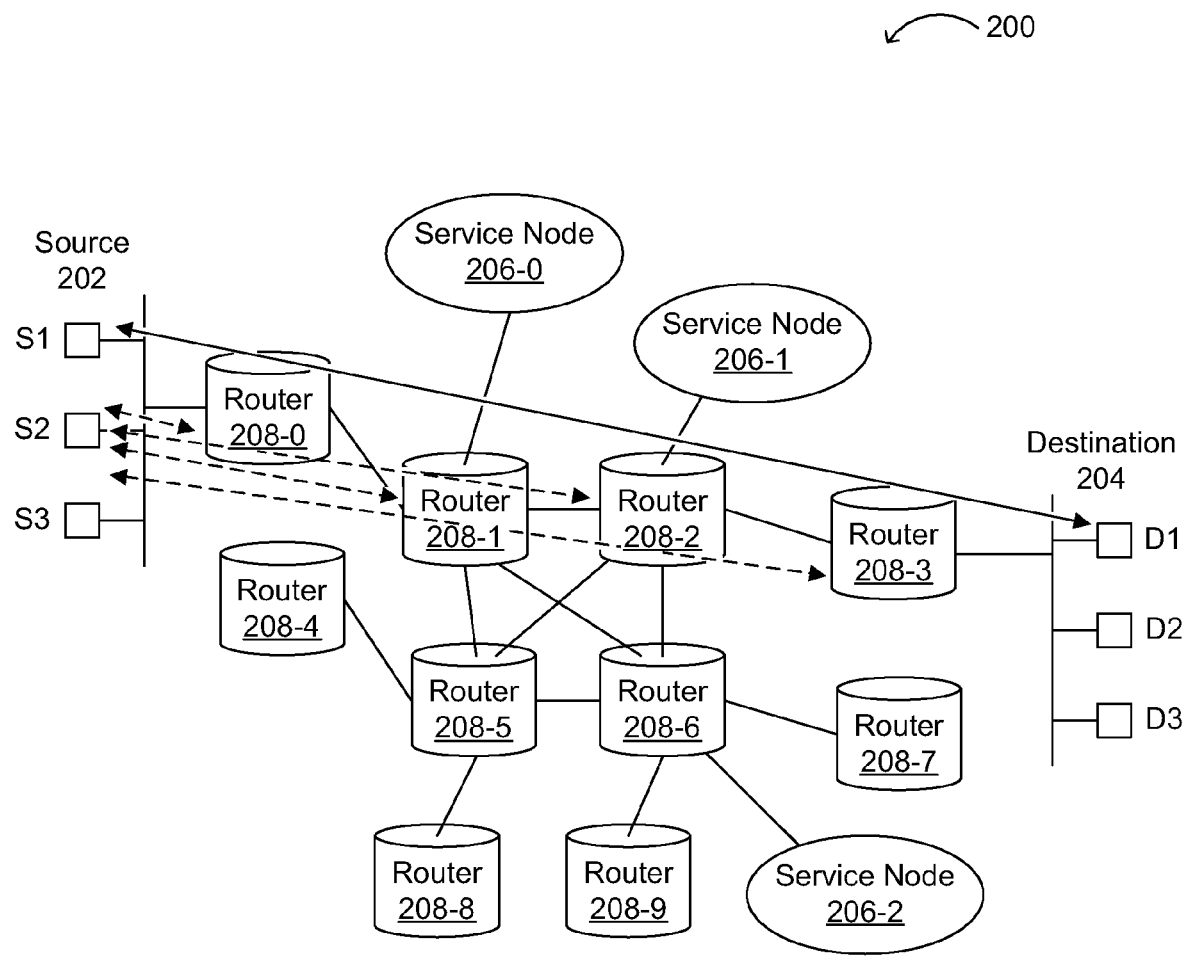
FIG. 2 illustrates an example Internet protocol (IP) operation, administration, and maintenance (OAM) system.

Referring now to FIG. 2, an example Internet protocol (IP) OAM system is shown and indicated by the general reference character 200. In this example, source 202 can include S1 "pinging" D1 at destination 204. Also, S2 may provide a "traceroute" to D2. However, such ping and traceroute approaches may not conventionally reflect service awareness or service paths. This may be problematic when services are not in a normal IP forwarding path (e.g., service nodes 206-0, 206-1) or are otherwise transparent (e.g., 206-2) to the forwarding path. Here, routers (e.g., 208-0, 208-1, 208-2, 208-3, 208-4, 208-5, 208-6, 208-7, 208-8, and 208-9) may only be encountered when part of the forwarding path (e.g., routers 208-0, 208-1, 208-2, and 208-3 for the traceroute from S2 to D2). Further, OAM should be able to report detailed service specifics in addition to basic service up/down and path reports.

In particular embodiments, a service header can be utilized to enable a service centric view of OAM, where each service (e.g., a service node) may process the service header for other purposes as well, and where encapsulation can allow an SIA OAM to be transported as a normal packet. The type of OAM requested can be indicated via the service header. For example, a service header "echo" can be utilized to request a response from a service about up/down state, and participation of the service and a specific service path. Also, a service header "trace" can be used to validate that a given service path/chain is functional and operating as expected. Particular embodiments can also allow for additional subtypes to be defined, as well as flexible return codes (e.g., a service is up but overloaded, a service is up but no next hop in the service chain, etc.).

Figure 3:
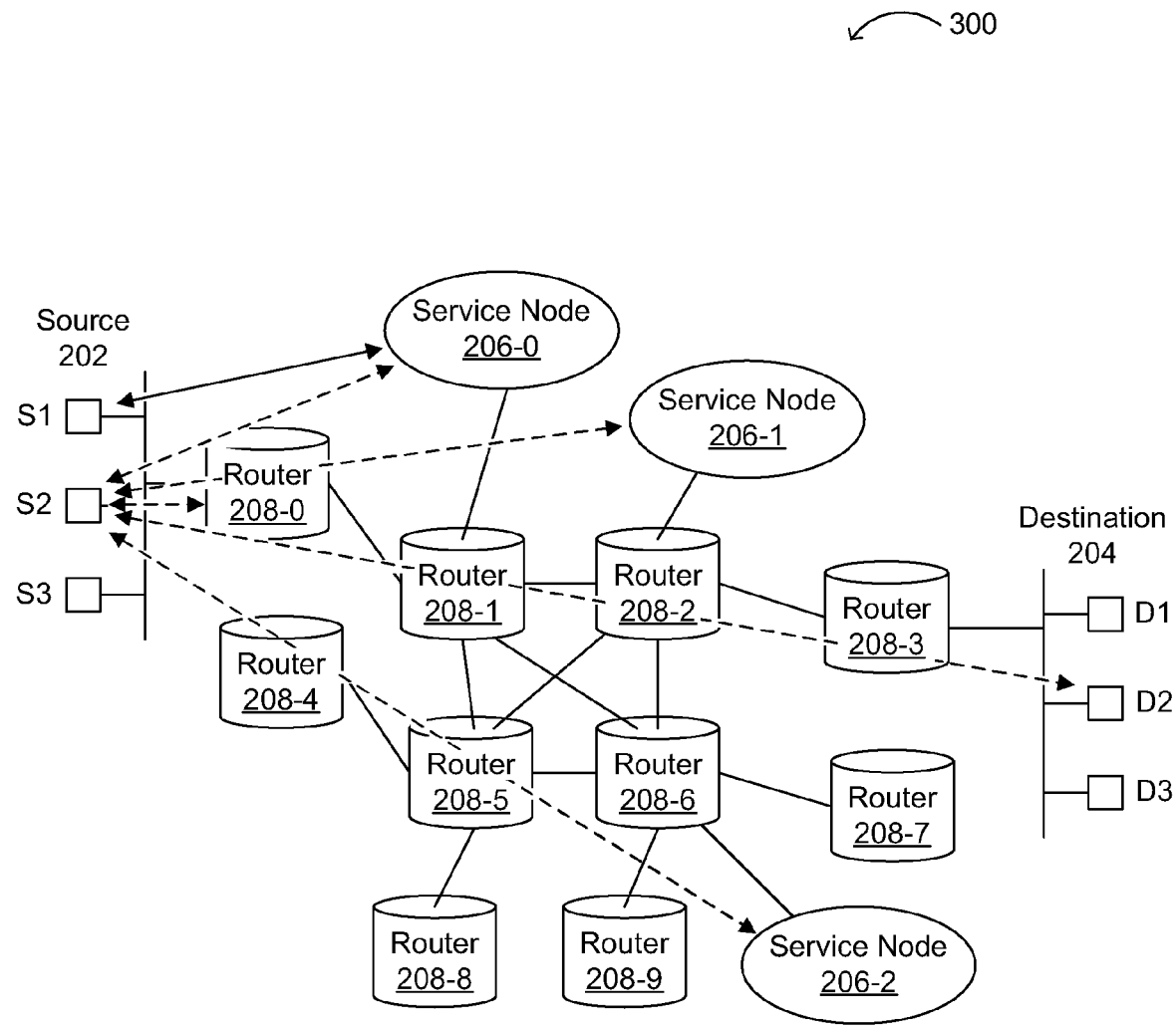
FIG. 3 illustrates an example SIA OAM system.

Referring now to FIG. 3, an example SIA OAM system is shown and indicated by the general reference character 300. The basic network structure can be substantially the same as shown above with reference to FIG. 2. In this example, source S1 can request an OAM echo from service node 206-0, and source S2 can request an OAM trace to destination D2. The trace can traverse the service path S1, service node 206-0, service node 206-1, service node 206-2, and destination D2. In this fashion, a given service path/chain can be validated, whereby all services in the chain can be traversed as in normal operation.

Figure 4:
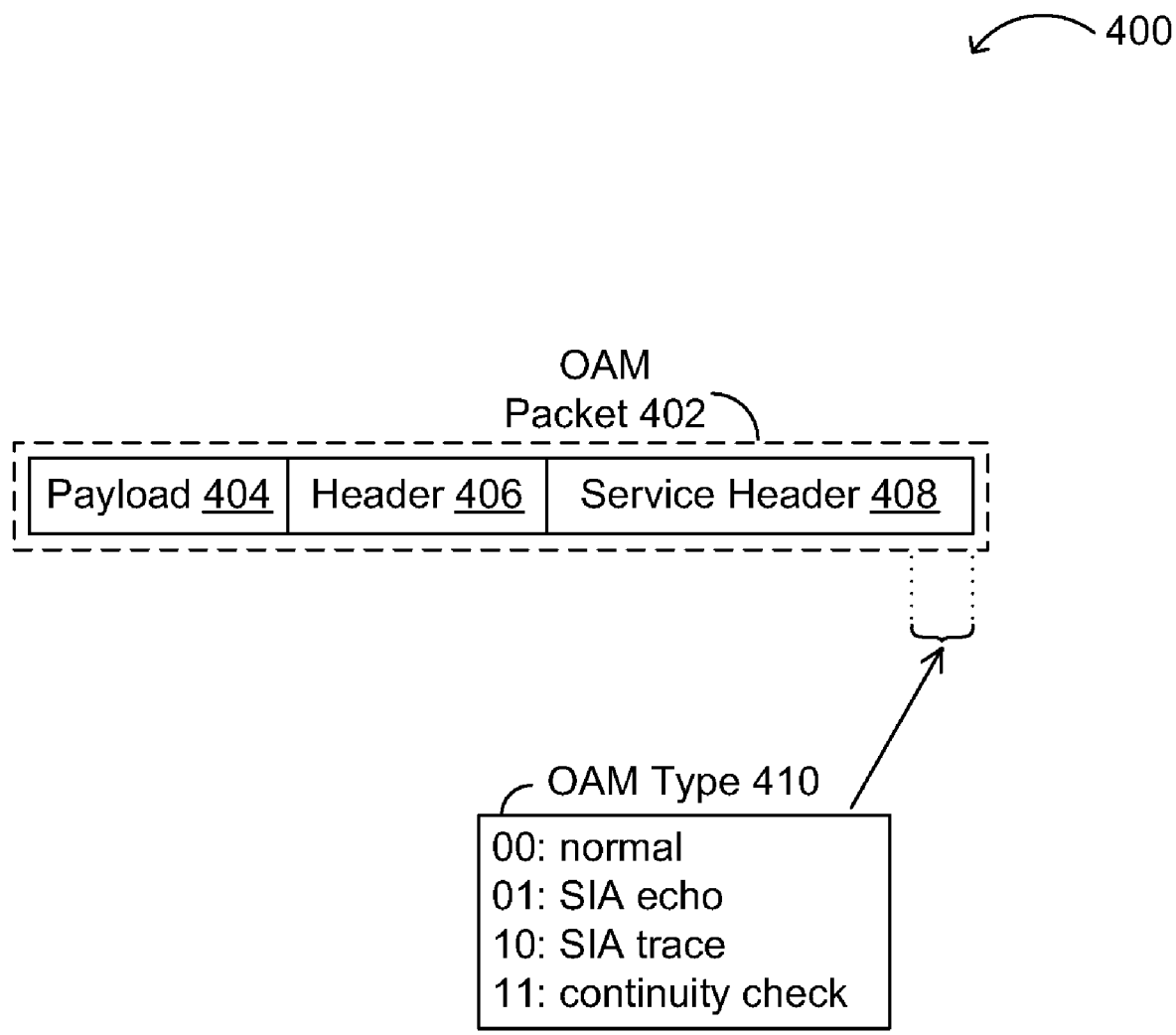
FIG. 4 illustrates an example OAM packet format for SIA.

Referring now to FIG. 4, an example OAM packet format for SIA is shown and indicated by the general reference character 400. OAM packet 402 can include payload 404, header 406, and service header 408. A portion of the service header can be utilized to indicate an OAM type 410. For example, OAM types 410 can include "00" to indicate normal or a non-OAM service packet, "01" to indicate an SIA echo type, "10" to indicate an SIA trace type, and "11" to indicate a continuity check. Of course, other OAM types and/or packet bits can be utilized to indicate services in particular embodiments. For example, a packet payload may be used to provide specific OAM subtypes, and to carry return information.

Also, while SIA OAM packets may return to the originator/requestor, a service broker in an SIA can also use OAM to change service allocation (e.g., withdraw, reallocate, etc.).

Figure 5:
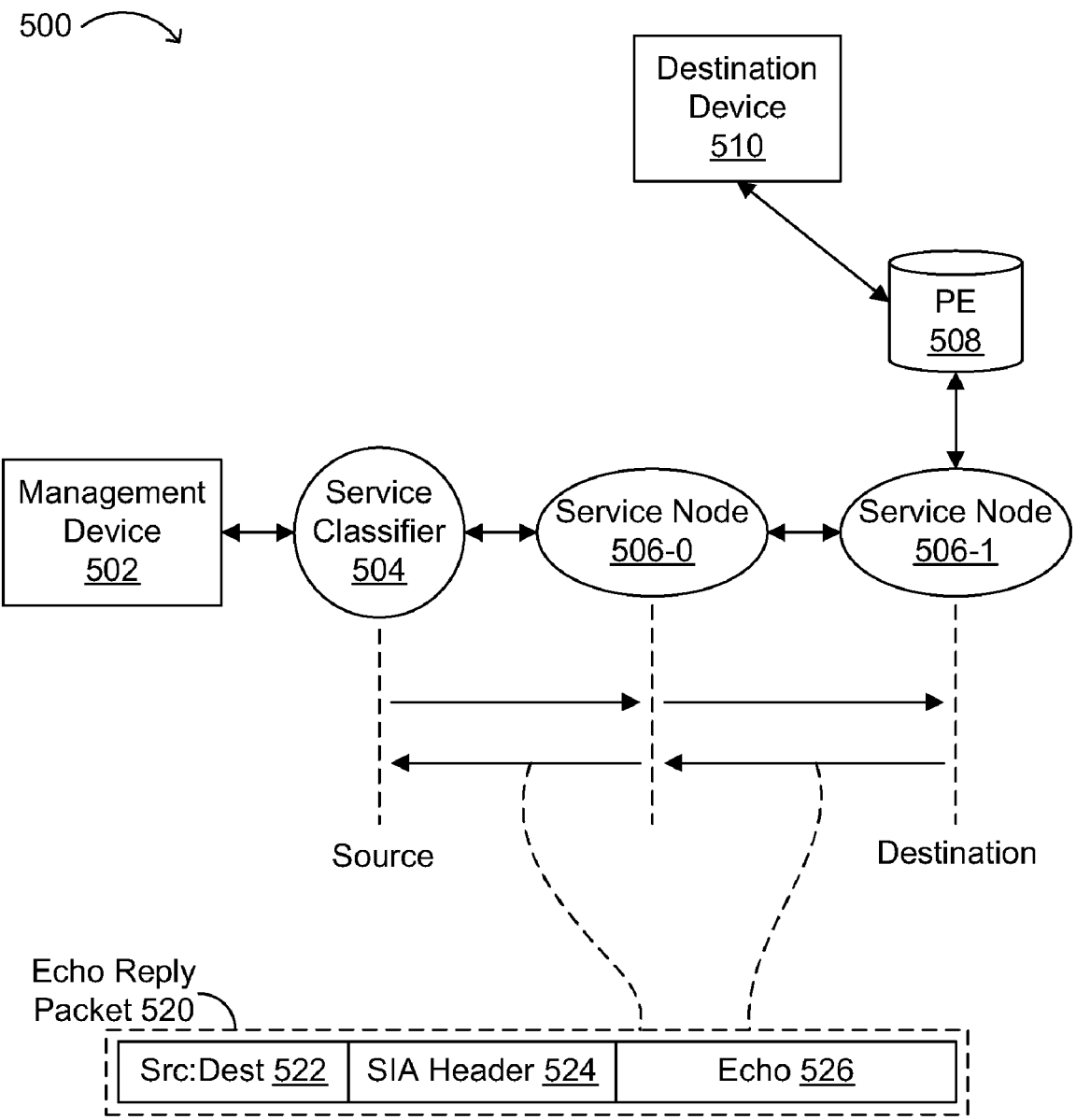
FIG. 5 illustrates an example OAM echo service for SIA.

Referring now to FIG. 5, an example OAM echo service for SIA is shown and indicated by the general reference character 500. For determining service availability information, a service echo can be utilized to send a query to a service node, and have the service node report back to the originator, thus checking that a destination node (e.g., a service node) is appropriately configured to respond via an SIA service path. The destination may be a service node's IP address or media access control (MAC) address (e.g., based on a layer 2 or 3 connectivity model), and may also contain user-specified conventions, such as a configured name of service, in order to facilitate identification of the responding device as the correct responder. Such a mechanism may be usable from any participating node or device in an SIA framework.

In particular embodiments, an SIA OAM echo can be a unicast message for the query and/or the reply. The source can be a management station (e.g., management device 502), a service classifier (e.g., 504), or any other SIA participant (e.g., a service broker, service node, etc.). For example, source can be indicated as an IP address or a MAC address. The destination can be any SIA data plane participant (e.g., a service classifier or service node). Here, the destination node may be service node 506-1, and the query/reply may traverse service node 506-0. Service node 506-1 may also interface with provider edge (PE) or router 508, which can interface with destination device 510.

For example, such an OAM echo packet can be generated on-demand via management information base (MIB) or command line interface (CLI). SIA echoes may also be specific to an SIA domain and an SIA header providing context. Thus, SIA echoes can include an appropriate SIA header as the packet traverses different service nodes in the chain, but with redirection at the targeted device for adjusting. In addition, timestamps and services offered on a particular service node may be embedded into the message for round-trip measurement.

When an SIA OAM echo packet traverses from a service classifier (e.g., 504) to a destination service node (e.g., 506-1), an echo reply packet 520 can be formulated. Echo reply packet 520 can include source/destination addresses 522, SIA header 524, and echo information 526. No reply may mean there is no service node at an indicated destination end. Also, the service nodes may send back an echo reply without a policy definition for SIA header "100" whereby a "syslog" message may be generated, resulting in possible operator action. Further, service nodes may send back a reply with SIA service header 100, and also an offered service (e.g., firewall) back to the service classifier (e.g., 504).

Figure 6:
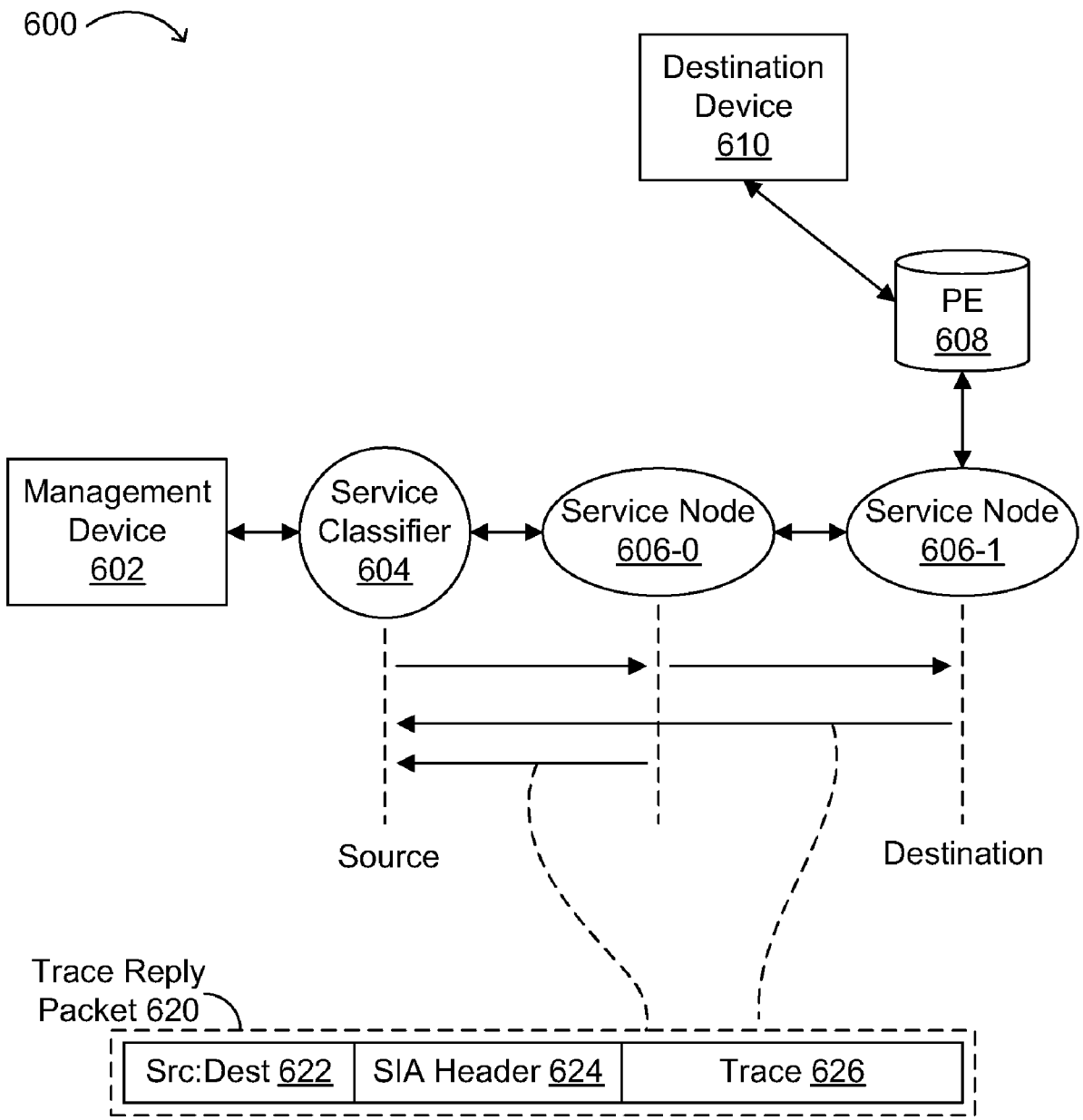
FIG. 6 illustrates an example OAM trace service for SIA.

Referring now to FIG. 6, an example OAM trace service for SIA is shown and indicated by the general reference character 600. For determining service path information, a specific service path can be traced, with each service node reporting information back to the requestor of the trace. Further, each service node may also concurrently or subsequently forward the trace packet to a next hop in the SIA service path. The OAM trace packet may include appropriate service header values such that the packet can traverse a correct or normal service path. In addition, each of the services touched by the trace can report back items, such as "service name" or other variables, which may then be used to provide more user-friendly service path information. An example of such service path information is shown below in Table 1.

TABLE 1

| Node | Description | Time |
|------|-------------|------|
| SCL | SFBranch | 10 ms (start of trace) |
| SN1 | SFFirewall | 3 ms |
| SN2 | SeattleIPS | 10 ms |
| SN3 | NewYorkDDoS | 60 ms (end of trace) |

As shown in Table 1, a user can determine whether devices placed into the SIA service path were indeed the devices that are responding to the service trace. Or, the user may determine that a mismatch was found between the policy created in the actual service path, and perhaps including service failure. The user may see a deployment-centric view of the service path due to the embedded naming response, and other variables associated with the trace.

In particular embodiments, an SIA OAM trace can be a unicast message implemented by an SIA application for the query and/or the reply. The source can be a management station (e.g., management device 602), a service classifier (e.g., 604), or any other SIA participant (e.g., a service broker, service node, etc.). For example, the source can be indicated as an IP address or a MAC address. The destination can be a representation of a service path indicated by an SIA header, and including a responder end station (e.g., a service node or destination device). Here, the destination node or end station may be service node 606-1, and the service path can include service node 606-0. Service node 606-1 may also interface with PE 608, which can interface with destination device 610.

For example, such an OAM trace packet can be generated on-demand via MIB or CLI. SIA trace may also be specific to an SIA service path, and associated SIA header. Thus, an SIA trace can validate all service node participants belonging to the same SIA service path between the "trace" originator, and along the path to the destination end station. An SIA trace in particular embodiments can include an appropriate SIA header for a service path to be tested, and the SIA header can remain substantially consistent with the packet during traversal of different service nodes in the SIA service path. In addition, services performed, load, and timestamps may be embedded into the reply message at each service hop.

When an SIA OAM trace packet traverses from a service classifier (e.g., 604) to a destination service node (e.g., 606-1), trace reply packets 620 can be formulated and sent from each service node in the path (e.g., one from 606-0, and another from 606-1). Trace reply packet 620 can include source/destination addresses 622, SIA header 624, and trace information 626. No reply may mean there is no service node at the destination end as indicated. Also, each service node may send back a trace reply with SIA header "100" and also the services offered (e.g., firewall) to service classifier 604. Service classifier 604 can then send this information to a service broker (e.g., 104 of FIG. 1), which can then access a service table to verify that services on SIA chain 100 are placed in an appropriate order (e.g., service node 606-0 (firewall), then service node 606-1 (IPS)).

Figure 7:
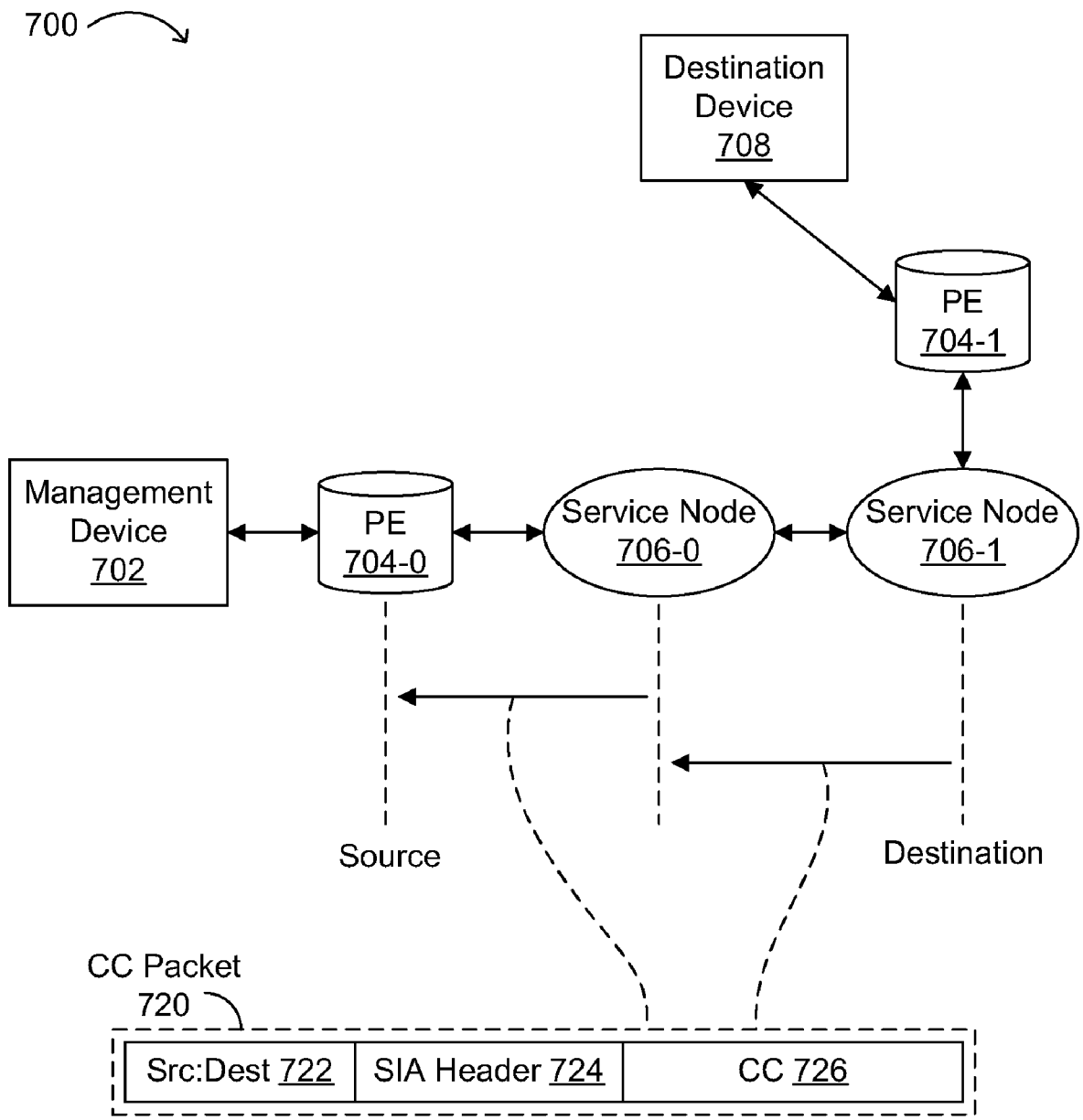
FIG. 7 illustrates an example OAM continuity check for SIA.

Referring now to FIG. 7, an example OAM continuity check for SIA is shown and indicated by the general reference character 700. A service continuity check in particular embodiments can include sending continuous "heartbeats" between nodes in an SIA service path to determine live service nodes, and also to quickly identify any path or service failures. Such path or service failures may be used to reconverge the service path, or to invalidate the current service path. In the example of FIG. 7, management device 702 can interface with PE 704-0, which may be a source for the service continuity check. The service chain can include service nodes 706-0 and 706-1, which can interface with PE 704-1, which can interface with destination device 708.

In particular embodiments, OAM service continuity checks can include per-chain and per-SIA header heartbeat messages. For example, such messages can be transmitted at a configurable periodic interval: from a service node to a service classifier; from a service node to another service node; and based upon path configuration (e.g., continuity checks from service nodes to service classifiers may be performed when a service node may be a first hop in the service path, but not when a service node is positioned between two other service nodes in the service path). Further, an SIA continuity check packet may have an appropriate SIA header as the packet is sent between different service nodes in a chain. Also, messages may be unidirectional, thus not necessarily soliciting a response. In this fashion, such messages may be considered indications of the health of a service to previous and/or post participants and the same service path. Thus, continuity check packet 720 (e.g., from service node 706-1 to service node 706-0, and/or from service node 706-0 to PE 704-0) can include source/destination 722, SIA header 724, and continuity check information 726.

Figure 8:
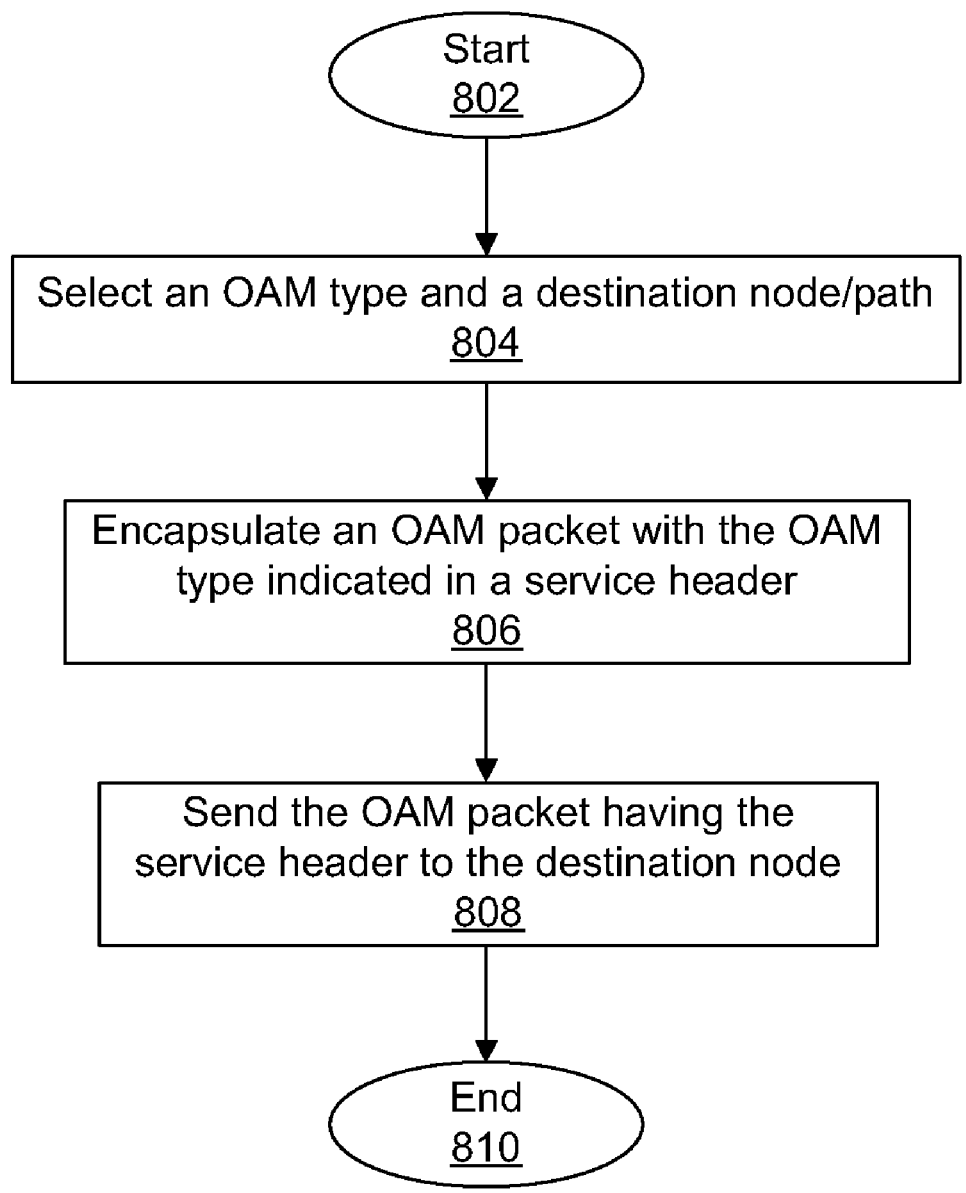
FIG. 8 illustrates a flow diagram of an example method of providing an OAM packet.

Referring now to FIG. 8, a flow diagram of an example method of providing an OAM packet is shown and indicated by the general reference character 800. The flow can begin (802), and an OAM type and destination path and/or node can be selected (804). An OAM packet can be encapsulated with the OAM type indicated in a service header (806). The OAM packet having the service header can be sent to the destination node (808), and the flow can complete (810).

Figure 9:
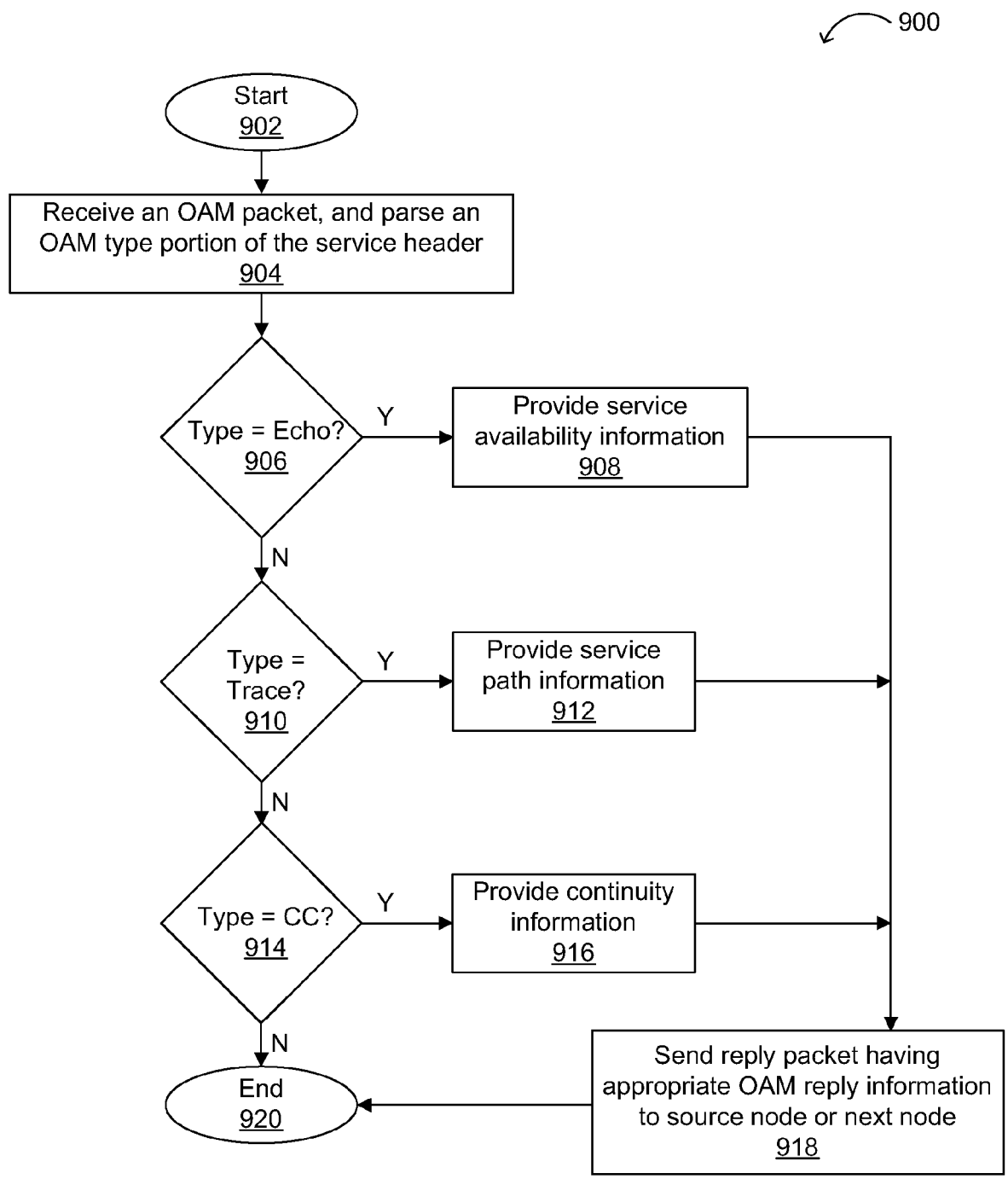
FIG. 9 illustrates a flow diagram of an example method of processing an OAM packet.

Referring now to FIG. 9, a flow diagram of an example method of processing an OAM packet is shown and indicated by the general reference character 900. The flow can begin (902), and an OAM packet can be received and parsed in a device enabled for SIA (904). The parsing can provide access to an OAM type embedded in the service header. If the OAM type is echo (906), service availability information can be provided (908). If the OAM type is trace (910), service path information can be provided (912). If the OAM type is continuity check (914), continuity information can be provided (916). Once the appropriate information is provided (e.g., as shown in 908, 912, 916), a reply packet having the appropriate reply information can be sent (918) to a source node (e.g., for echo and trace OAM types), or to a next or target node (e.g., for a continuity check OAM type), and the flow can complete (920).

In particular embodiments, OAM ideas may be extended to specific service status checking, as well as to checking that a series of services may be applied for SIA-enabled networks. Further, SIA paths and/or nodes can be verified once a service broker distributes service header information to service classifiers and service nodes in a service chain. For verification, a management operator can initiate a simulation/verification test of an SIA packet to an SIA service path, which may be acted upon by each of the services in the service path. Each service node can receive a verification packet, and may treat the packet like a regular data packet, and apply appropriate action. An overall pass/fail result can also be obtained.

In addition to the header and other data plane attributes, SIA OAM packets can include specific payloads used to elicit appropriate messages from SIA-enabled nodes (e.g., about status, or the like). Data returned in response to these messages may be used to determine the status, health, and/or to provide validation of a configuration of the SIA services in a specified service path. In this fashion, each service node may process a header, then as appropriate respond to a message contained in the payload, and in certain instances concurrently respond with messages to other nodes in the service path.

Although the description has been described with respect to particular embodiments thereof, these particular embodiments are merely illustrative, and not restrictive. For example, while specific OAM types and SIA arrangements have been described herein, any suitable OAM or other such probing, testing, and/or architectures can be supported in particular embodiments. In addition, timestamps or other suitable information (e.g., packet loss derived from packets received) can be inserted into a reply packet payload in order to correlate (e.g., at a management station/device) network characteristics for a given service path.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
    selecting an operation, administration, and maintenance (OAM) type for a destination, wherein the destination is enabled for a service insertion architecture (SIA), wherein the SIA comprises a service classifier that is configured to redirect packets to one or more of a plurality of service nodes for servicing;
    encapsulating an OAM packet with the OAM type indicated in a service header of the OAM packet, the OAM type designating an OAM function to be performed using the OAM packet, wherein the OAM type is selectable from normal, SIA trace, SIA echo, and continuity check;
    sending the OAM packet to the destination by traversing at least one of the plurality of service nodes; and
    receiving a reply packet from the destination, wherein the reply packet includes information indicating performance of the OAM function.

2. The method of claim 1, wherein the service header is processed by the at least one service node for purposes other than the OAM function.

3. The method of claim 1, wherein the encapsulating comprises indicating the OAM type using dedicated bits in the service header.

4. The method of claim 3, wherein the encapsulating further comprises appending the service header and an SIA header with a payload.

5. An apparatus, comprising:
    one or more processors; and
    logic encoded in one or more tangible media for execution by the one or more processors, and when executed operable to:
        select an operation, administration, and maintenance (OAM) type for a destination, wherein the destination is enabled for a service insertion architecture (SIA), wherein the SIA comprises a service classifier that is configured to redirect packets to one or more of a plurality of service nodes for servicing;
        encapsulate an OAM packet with the OAM type indicated in a service header of the OAM packet, the OAM type designating an OAM function to be performed using the OAM packet, wherein the OAM type is selectable from normal, SIA trace, SIA echo, and continuity check;
        send the OAM packet to the destination by traversing at least one of the plurality of service nodes; and
        receive a reply packet from the destination, wherein the reply packet includes information indicating performance of the OAM function.

6. The apparatus of claim 5, wherein the destination comprises one of the plurality of service nodes.

7. The apparatus of claim 5, wherein the destination comprises a service path having a chain of service nodes from among the plurality of service nodes.

8. The apparatus of claim 7, wherein an ordering of the chain of service nodes is indicated in the service header.

9. The apparatus of claim 5, wherein the OAM type of normal indicates no OAM function is to be performed.

10. The apparatus of claim 5, wherein the service header is processed by the at least one service node for purposes other than the OAM function.

11. A method, comprising:
    receiving an operation, administration, and maintenance (OAM) packet in a device enabled for a service insertion architecture (SIA), wherein the SIA comprises a service classifier that is configured to redirect packets to one or more of a plurality of service nodes for servicing, the OAM packet having traversed at least one of the plurality of service nodes;
    parsing an OAM type from a service header in the OAM packet, wherein the OAM type is selectable from normal, SIA trace, SIA echo, and continuity check;
    performing an OAM function designated by the OAM type and using the OAM packet; and
    sending a reply packet to a source node or a next node, wherein the reply packet includes reply information based on the OAM type to indicate performance of the OAM function.

12. The method of claim 11, wherein the parsing comprises accessing designated bits in the service header and determining the OAM type therefrom.

13. The method of claim 11, wherein the reply information comprises service availability information when the OAM type corresponds to the SIA echo.

14. The method of claim 11, wherein the reply information comprises service path information from among the plurality of service nodes when the OAM type corresponds to the SIA trace.

15. The method of claim 11, wherein the reply information comprises continuity information when the OAM type corresponds to the continuity check for SIA.

16. The method of claim 11, wherein the sending the reply packet comprises maintaining an SIA packet header.

17. An apparatus, comprising:
    one or more processors; and
    logic encoded in one or more tangible media for execution by the one or more processors, and when executed operable to:
        receive an operation, administration, and maintenance (OAM) packet in a device enabled for a service insertion architecture (SIA), wherein the SIA comprises a service classifier that is configured to redirect packets to one or more of a plurality of service nodes for servicing, the OAM packet having traversed at least one of the plurality of service nodes;
        parse an OAM type from a service header in the OAM packet, wherein the OAM type is selectable from normal, SIA trace, SIA echo, and continuity check;
        perform an OAM function designated by the OAM type and using the OAM packet; and send a reply packet to a source node or a next node, wherein the reply packet includes reply information based on the OAM type to indicate performance of the OAM function.

18. The apparatus of claim 17, wherein the device comprises a service node from among the plurality of service nodes.

19. The apparatus of claim 17, wherein the service header is processed by the at least one service node for purposes other than the OAM function.

20. The apparatus of claim 17, wherein the received OAM packet comprises a unicast message from another SIA enabled node.

* * * * *